United States Patent [19]
Nath

[11] Patent Number: 5,385,401
[45] Date of Patent: Jan. 31, 1995

[54] PROCESS FOR ADDING RECYLCED TIRE PARTICLE TO ASPHALT

[75] Inventor: Robert H. Nath, Albuquerque, N. Mex.

[73] Assignee: Cyclean, Inc., Austin, Tex.

[21] Appl. No.: 132,359

[22] Filed: Oct. 6, 1993

[51] Int. Cl.$^6$ ............................................. C08L 95/00
[52] U.S. Cl. ........................................... 366/7; 366/8; 404/32
[58] Field of Search ............ 366/1, 2, 3, 4, 5, 6, 366/7, 8, 16, 22, 23, 24, 25, 144, 147, 348; 404/32, 73, 76; 524/66, 68, 59, 925, 65, 232; 260/998.17; 106/273, 283, 281.1

[56] References Cited

U.S. PATENT DOCUMENTS

| | | | |
|---|---|---|---|
| 2,952,650 | 9/1960 | Wood | 260/28.5 |
| 3,253,521 | 5/1966 | Endres | 404/32 |
| 3,338,849 | 8/1967 | Johnson | 260/4 |
| 3,919,148 | 11/1975 | Winters et al. | 260/28.5 |
| 4,118,137 | 10/1978 | LaGrone et al. | 404/76 |
| 4,318,619 | 3/1982 | Schlarmann | 366/4 |
| 4,787,938 | 11/1988 | Hawkins | 366/4 |

OTHER PUBLICATIONS

R. Nath, Declaration, May 25, 1994.
M. Miles, Declaration, May 31, 1994.

*Primary Examiner*—David A. Scherbel
*Assistant Examiner*—Reginald L. Alexander
*Attorney, Agent, or Firm*—Ronald R. Snider

[57] ABSTRACT

A method of incorporating used automobile tire scrap into asphalt uses a step of saturating rubber particles with an aromatic oil. The rubber particle containing oil does not absorb additional oils from the asphalt binder materials and the integrity of the asphalt mix is not compromised.

19 Claims, 1 Drawing Sheet

PROCESS FOR ADDING RECYLCED TIRE PARTICLE TO ASPHALT

BACKGROUND OF THE INVENTION

1. Field of the Invention

This invention is for processing of recycled asphalt pavement or virgin asphalt where the mixture contains recycled rubber. The Federal Highway bill (ISTEA) enacted in December 1992 requires each state to use asphalt pavement containing asphalt rubber in 5% the total tons of asphalt pavement laid in the state and financed in whole or in part by Federal funds. The required percentage of asphalt pavement containing recycled rubber, in relation to the total tons of asphalt laid in each state, increases by 5% each year until reaching 20% in 1997.

The Federal Highway Bill mandate requires that there be threat to human health or the environment, that the asphalt containing rubber must be recyclable and that the performance of the rubber containing asphalt pavement must be equivalent to that of existing hot-mix pavements.

The accumulation of used tire carcasses has become a substantial environmental problem. A need has therefore developed to dispose of old tire carcasses, and incorporation of the tire rubber into hot-mix asphalt provides an attractive solution.

2. Description of the Prior Art

In the prior art, reprocessed rubber from automobile tires has been used in various mixtures to form paving material for roads.

U.S. Pat. No. 3,915,581, Copp, Jr., teaches the use of shredded or powdered automotive tires which is processed to be suitable for vulcanizing. This utilization of reprocessed rubber is directed to rubber pavement, contains a high percentage of used rubber and is not a component of hot-mix asphalt.

U.S. Pat. No. 2,952,650, Wood, teaches the use of a rubber powder and incorporation of the rubber powder in the amount of generally 1 to 20% of the asphalt content. In this process, butyl rubber is masticated at elevated temperatures with a rubber plasticizer, carbon black and vulcanizing ingredients until the rubber vulcanizes. The contemplated rubber, however, is not used automobile tire. The use of a rubber plasticizer similar to the asphalt used in roads and having a penetration value from 40 to 300 is suggested. The rubber processing oil may be an aromatic, napthanic or asphaltic rubber softening oil.

U.S. Pat. No. 3,915,581, Copp, Jr., teaches the use of a rubber paving material. In this disclosure, the author recommend against adding shredded or ground rubber to a binder, and that the rubber be reprocessed into a vulcanizing state and applied as a solid rubber paving.

U.S. Pat. No. 3,253,521, Endres, teaches a rubberized bitumen particulated rubber. An adhesive composition for the rubbery asphalt is disclosed as containing 3% of rubber and 97% of 85/100 penetration asphalt on a weight basis. The microscopically dispersed rubber in the bitumen is disclosed as being between 2% and no more than 10%.

U.S. Pat. No. 2,977,864 is another example of a rubberized asphalt which may contain 2% weight by rubber. Rubber pellets are heated to a temperature of 250° F. and then placed in a pug mill mixer and mixed fine rubber particles.

BRIEF SUMMARY OF THE INVENTION

The mere incorporation of finely ground reclaimed tire rubber into an asphalt does not produce a suitable material or end product. One reason is that the finely ground rubber tends absorb oils or asphalting materials from the hot-mix asphaltic materials which are a part of the hot-mix asphalt. The absorption of the oils leads to a degradation of the life and performance the asphalt in service.

In this invention, ground rubber from scrap tires is treated first with an aromatic oil or other light oil prior incorporation to and HMA mixture. During this addition of oil the rubber, sufficient oil is added to substantially saturate the rubber particles with oil, thereby preventing subsequent absorption of oils from asphalt into the rubber when the rubber is added to the asphalt mix. Applicant has found that the ratio of oil to rubber may be in the order of 40 to 60%. The adding of oil to the rubber should be in an amount sufficient to prevent the rubber from removing oils from the asphalt during subsequent steps of heating and mixing. In this invention, applicant uses a rubber which has been finely ground to a mesh size of 10 to 30.

In Applicant's treatment of the ground rubber particles, the rubber particles become activated and appear to be of a fluffy composition. In Applicant's mixture, 3% of the weight of the asphalt may comprise the rubber which has absorbed substantial quantities of aromatic oils. There may be equal parts of rubber and oil in the final activated rubber material to be mixed into the hot-mix asphalt.

In Applicant's invention, Applicant provides for the mixing of the activated rubber and hot-mix asphalt at a pug mill located at the output of a hot-mix asphalt processing drum mixer. The pug mill location is selected because there are no high velocity gas flows or gas turbulence which will tend to pick up and carry the activated rubber out of a recycled asphalt pavement (RAP) processing drum mixer. Applicant has found that mixing the pug mill after the asphalt material has been prepared provides the best mixing of hot-mix asphalt and the activated rubber to be added to the mixture.

The insertion of the oil containing rubber particles into the pug mill may be by means of an auger drive which can be varied in speed in order to control the percentage of rubber in the rubberized asphalt. One suitable oil is Sunoco Hydralene 90-T. Applicant has discovered that rejuvenating oils and the type used for rejuvenating asphalt composition in production of hot-mix asphalt from RAP are acceptable oils to use with the finely ground rubber particles from automobile scrap tires.

DETAILED DESCRIPTION OF THE INVENTION

Figure 1:
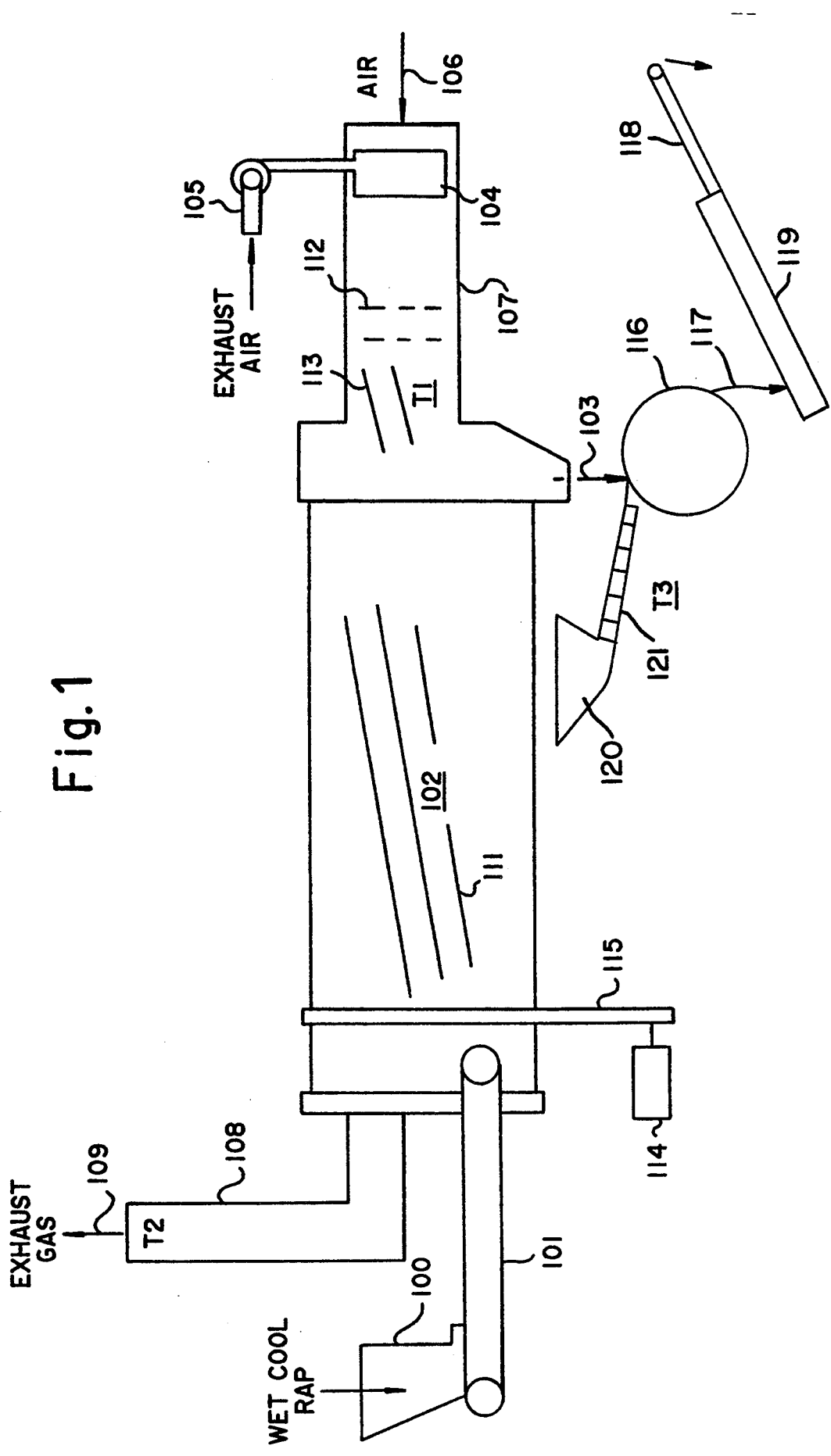
FIG. 1 shows a typical counterflow RAP processing drum, including a pug mill and microwave treatment apparatus.

In FIG. 1, there is shown a counterflow recycled asphalt pavement processing drum. The drum 102 includes flights 111 for urging RAP along through the drum and for raising the RAP and causing a vail to fall within the drum. Drum 102 is driven by a motor means 114 and a belt or chain drive 115. Wet RAP is inserted into the hopper 100 and into the drum 102 by way of a conveyer 101. System exhaust gasses 109 are removed by a conduit or pipe 108. A blower 105 receives some exhaust air, and powers a burner 104. Burner 104 produces a flame in passage 107. The flame however, is shielded from the RAP by means of plates 112 and vanes 113. RAP exits the drum 102 at location 103 where it is inserted into a pug mill 116. The pug mill has an output at 117 which feeds a mixture of RAP and particles of rubber to a conveyer belt 118. Surrounding the conveyer belt 118 is a microwave treatment process tunnel 119. The RAP exiting the pug mill at location 117 falls upon a conveyer 118 and undergoes microwave treatment as it travels along the microwave treatment 119. Another hopper 120 receives fluffed or activated rubber and holds it for insertion into the pug mill 116. An auger drive 121 is used to insert the fluffed activated rubber material into the pug mill 116 and the speed of the auger 121 determines the percentage rubber in the final rubberized RAP product which moves along conveyer 118.

Another separate mixer may be used for preparing activated rubber particles. This mixer must assure that the rubber absorbs a necessary amount of oil (preferably aromatic oils) so that when the rubber is inserted into the pug mill, it will not tend to remove oils and binders from the hot-mix asphalt being supplied from the drum 102 to pug mill 116. The hot mix asphalt contains oils and binders.

The percentage rubber in hot-mix asphalt has been found to be preferably in the range of 1 to 3%. The Federal Highway legislation specifying that certain percentages of a states total asphalt pavement must contain rubber, does not require high percentages of rubber to be used. The definition of asphalt pavement containing recycled rubber requires that there be not less than 20 pounds of recycled rubber per ton of hot-mix or 1% by weight. In Applicant's invention, approximately 1% by weight ground tire particles is combined with approximately 1% of aromatic rejuvenating oil.

It is known that the use of aromatic oils increase rubber's resistance to cracking and improves tearing resistance. It has also been found that aromatics can have a similar beneficial effect on asphalt, See roads and bridges/January 1883 "Recycled asphalt binder can meet SHRP specs" by Gall M. De Long p. 37.

This article however, does not suggest that aromatic oil treated rubber may be used as an ingredient in hot-mix asphalt.

Applicant has discovered that pretreating crumb rubber with an aromatic oil solves the problem of oil absorption by the crumb rubber. The temperature at which smoking occurs is in excess of 300° F. to 350° F. A temperature of 300° F. to 330° F. has been found to prevent the rubber from removing oils from the asphalt.

EXAMPLE 1

An asphalt-rubber bituminous mixture that meets all of the Federal guidelines for asphalt-rubber mixtures has promulgated under section 1038 of the 1992 intermodal surface transportation efficiency (ISTEA) has been produced. The asphalt-rubber bituminous hot-mix can be produced with a microwave enhanced process which meets the requirements of the EPA's proposed AP-42 air emissions guidelines.

An apparatus which may be used for the manufacture of the reclaimed asphalt pavement is that shown in U.S. Pat. applications Ser. Nos. 07/803,642 (now U.S. Pat. No. 5,303,999) and 07/948,639, which are incorporated herein by reference.

The material used in the mixture should be a minimum of 80% RAP and a minimum of 1% recycled crumb rubber. The crumb rubber may be from reclaimed vulcanized rubber produced from the processing of scrap tires. The gradation of the rubber is in accordance with ASTM C-136 and in accordance with the following requirements.

TABLE 1

| Sieve Size | Type II Gap and Open Graded | Type III Dense Graded |
|---|---|---|
| #8 | | |
| #10 | 100 | 100 |
| #16 | 75–100 | 98–100 |
| #30 | 25–60 | 70–100 |
| #50 | 0–20 | 10–40 |
| #200 | 0–5 | 0–5 |

The specific gravity of the crumb rubber should be in the order of 1.5±0.05 and the rubber should be free of fabric wire or other contaminating materials. Up to 4% calcium carbonate can be used to prevent the particles of rubber from sticking together. The mixer is a continuous pug mill type. The amount of aggregate, asphalting materials, pre-treated crumb rubber, and additives entering the mixture and the rate of travel through the mixer are coordinated so that a uniform mixture will be produced. A dam gate at the discharge end of the pug mill and/or pitch of the mixing paddles can be adjusted to maintain a level depth of mixture in the pug mill between the paddle shaft and the upper paddle tips.

EXAMPLE 2

238.6 tons of 100% RAP asphalt hot-mix asphalt was laid on the West Frontage road of I-35E near Forreston, Tex. The mixture was produced from the same recipe as all of the rest of the I-35E Cyclean, Inc. RAP containing asphalt, except that 1.2% of activated crumb rubber was added ahead of the pug mill mixer by means of a calibrated auger system. The crumb rubber was prepared beforehand. Approximately 2940 pounds of Sunoco Hydralene was used to activate the rubber. The total weight of rubber plus the oil was 5950 pounds. This comprised 1.25% of the entire mixture. 3010 pounds of crumb rubber were added.

The asphalt laydown area was tack coated after sweeping. The Laydown proceeded from North to South on the length furthest from the interstate. The existing asphalt layer plus 50 linear yards concrete were overlayed. A first run was rolled with a vibratory steel drum with one pass over with a rubber tire roller. A second lane was rolled only with the steel drum due to a breakdown of the rubber tire unit. This asphalt-rubber pavement remained excellent condition more than one year later.

What is claimed:

1. A method of manufacturing asphalt-rock compositions containing rubber for placement on highways comprising in combination the steps of:

finely grinding rubber from scrap rubber tires to make finely ground rubber;

mixing said finely ground rubber with oil at ambient temperature and at a ratio of approximately one pound of rubber to one pound of oil;

further mixing said rubber and oil mixture with asphalt; and heating said mixture of asphalt and rubber to a temperature which is less than that which causes smoking, and which is high enough to prevent said rubber from removing oils from the asphalt.

2. The method in accordance with claim 1, wherein the ratio of oil to rubber at said mixing step is between forty and sixty percent oil.

3. The method in accordance with claim 1, wherein oil is mixed with said finely ground rubber in a quantity sufficient to prevent said rubber from removing oils from said asphalt during the step of heating the mixture of asphalt and rubber.

4. The method in accordance with claim 1, wherein said rubber is finely ground at room temperature and at a size that passes a mesh size of 10 to 30.

5. The method in accordance with claim 1, wherein said asphalt and rubber mixture is held to 300° to 330° F.

6. The method in accordance with claim 1, wherein said step of mixing rubber with asphalt results in a ratio of 1% to 3% rubber in the asphalt mixture.

7. The method in accordance with claim 1, wherein the rubber is activated by addition of oil at ambient room temperature, and wherein the resulting activated rubber comprises between one and three percent by weight of the mixture of asphalt and rubber.

8. The method in accordance with claim 1, further comprising mixing said rubber in asphalt in a pug mill located at the output of a RAP processing drum mixer.

9. The method in accordance with claim 8, wherein said drum mixer is a counterflow drum.

10. A method for production of rubberized asphalt comprising the steps of:

processing recycled asphalt pavement (RAP) in a counterflow drum plant;

feeding recycled asphalt pavement (RAP) from said drum to a pug mill;

combining finely ground rubber particles with oil until the rubber becomes activated; and insertion of said activated rubber into said pug mill for mixing with said recycled asphalt pavement (RAP).

11. The method in accordance with claim 10, further comprising the step of subjecting the mixture of asphalt and rubber to microwave radiation after processing in said pug mill.

12. A process for manufacture of rubberized asphalt comprising the steps of:

heating asphalt to a predetermined temperature in a first drum mixer;

adding said heated asphalt to a mixture of rubber particles an oil in a second mixer; and wherein the second mixer is not subjected to high velocity gas flows from said first drum mixer.

13. A method in accordance with claim 12, wherein said heated asphalt temperature is controlled to be less than that which would cause degradation or smoking of said mixture of rubber particles and oil.

14. The method in accordance with claim 13, wherein said oil is an aromatic solvent.

15. The method in accordance with claim 13, wherein said rubber and oil particles have a density of 1.2 $g/cm^2$.

16. The method in accordance with claim 12, wherein said second mixer is a pug mill with an auger drive which can be varied in speed.

17. The method in accordance with claim 13, wherein said is Sunoco Hydralene 90-T.

18. A method in accordance with claim 12, further comprising the step of mixing of rubber particles and oil to produce fluffed-up rubber prior to said step of adding.

19. The method in accordance with claim 12, wherein said rubber particles are saturated with oil.

* * * * *